Dec. 20, 1932.  A. G. WISE  1,891,398
APPARATUS FOR PRINTING CONTINUOUS FILMS
Filed March 20, 1929    3 Sheets-Sheet 1

Inventor
Anthony G. Wise
By Lyon & Lyon
Attorneys

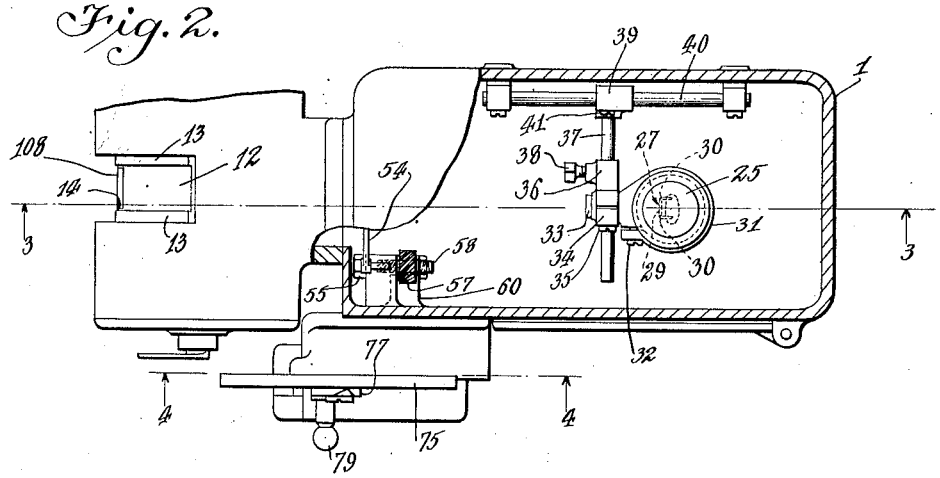
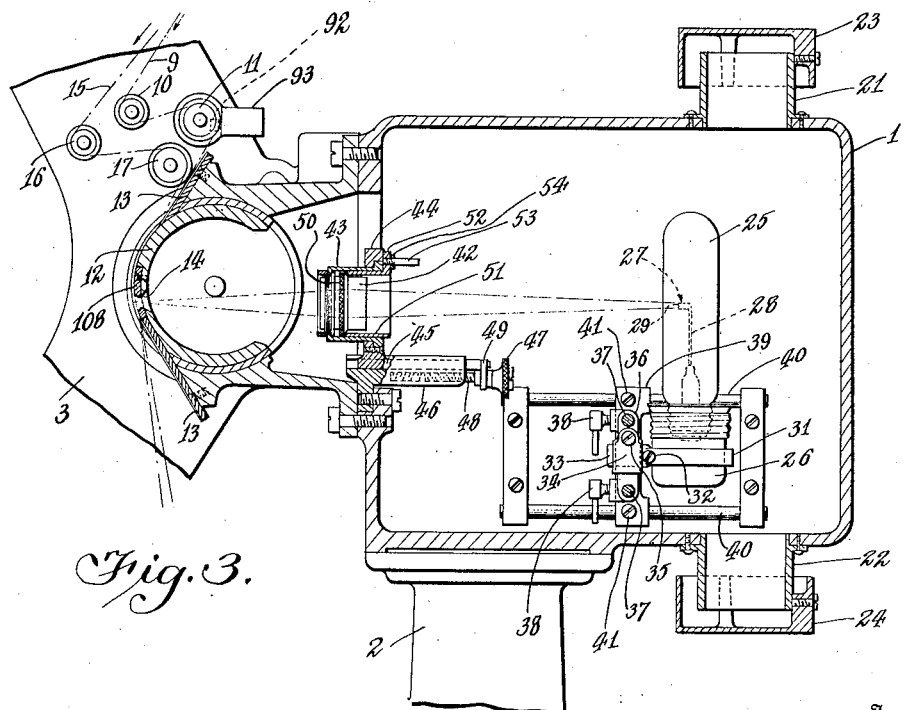

Dec. 20, 1932.  A. G. WISE  1,891,398
APPARATUS FOR PRINTING CONTINUOUS FILMS
Filed March 20, 1929   3 Sheets-Sheet 3

Inventor
Anthony G. Wise
By Lyon & Lyon
Attorneys

Patented Dec. 20, 1932

1,891,398

UNITED STATES PATENT OFFICE

ANTHONY G. WISE, OF BEVERLY HILLS, CALIFORNIA, ASSIGNOR TO METRO-GOLDWYN-MAYER CORPORATION, OF CULVER CITY, CALIFORNIA, A CORPORATION OF NEW YORK

APPARATUS FOR PRINTING CONTINUOUS FILMS

Application filed March 20, 1929. Serial No. 348,425.

This invention relates to an apparatus adapted to print continuous films rapidly and effectively, and to a particular combination and arrangement of elements whereby continuous film transparencies having sound records thereon may be printed without impairing the quality of the impressions recorded upon the original transparency.

The apparatus embraced by this invention may be employed for the printing of various continuous films having either action scenes or sound recorded thereon. More particularly, however, the apparatus is adapted for the printing of films having sound records thereon.

In printing continuous films heretofore, the film transparency has been passed in printing relation with a sensitized film over an aperture which has been illuminated by a lamp within a suitable light-tight housing. Mechanically, the machines of the prior art are adapted to move the films, that is both the developed transparency and the sensitized film, over the aperture, but difficulty has been experienced in regulating the light intensity to which the films are subjected.

A continuous film is almost always composed of a plurality of scenes, for example, interior views, exterior views, close-ups, etc. The light intensity required to print the various scenes should be changed with each scene as very often the transparency which it is desired to print contains scenes which have been photographed under such conditions of light intensity and time of exposure that the printing time or the light intensity during the printing operation has to be varied from scene to scene, in order to produce a print of the required distinctness.

Attempts have been made to provide an automatic mechanism adapted to cooperate with the transparency being printed so as to vary the light intensity during the printing of various scenes by varying the amount of electrical energy supplied to the printing light. This method has not been entirely satisfactory, particularly where it is desired to make prints of transparencies bearing thereon sound records.

One of the most common forms of sound records made on continuous films comprises a continuous film having narrow light lines of various density and in parallel relation thereon. These sound records are obtained by recording very narrow beams of light upon a film, the light passing through a light valve having an aperture of only about 0.0015 inches. The walls of this aperture vibrate under the influence of electrical circuits set up by variations of sound waves. The extremely narrow beam of light passing through the vibrating throat of the instrument causes extremely narrow light impressions to be recorded upon the film in the form of parallel bands, varying in thickness from about 0.0015 inches to several multiples of this dimension.

In printing films from continuous film transparencies bearing sound records of the hereinabove described character, a great deal of difficulty has been encountered in producing prints from which the sound can be reproduced with substantially the same fidelity with which it has been recorded. The unsatisfactory character of printed sound films of the prior art apparently lies in the character of the light used during the printing operation. In view of the extremely narrow light impressions recorded upon the original sound film and the character of the light employed during the printing operation, the identity of the individual bands (recorded upon the original film) is either lost or impaired by the printing. A single point source of illumination is not employed and is incapable of being produced.

The normal source of illumination employed during printing consists of a very long single filament or a plurality of filaments. The light produced by a source of this nature is not in the form of parallel beams, and diffusion and refraction occurs when such light passes through a transparency bearing the sound record thereon during the printing operation.

By carrying out the printing operation in accordance with this invention, continuous films may be printed having substantially the same distinctness, clarity and accuracy as the images recorded upon the original film. An object of this invention is to disclose and provide an apparatus for printing continuous films or film transparencies in a rapid and accurate manner.

Another object is to disclose and provide an apparatus for printing continuous film in which the printing light may be most effectively regulated and controlled.

It is to be understood that by "printing" is meant the production of either positive or negative prints from a transparency of opposite character. That is, the apparatus may be employed for printing negatives from positives, or positives from negatives.

Furthermore, it is to be understood that the invention is not limited to the printing of any particular type of scene or sound recording, and may be employed for printing continuous films bearing the images of action, inanimate objects or of sound vibrations thereon, this invention not relating to the methods employed in producing such original continuous films or images thereon.

For purposes of illustration the invention will be described with greatest particularity as it pertains to apparatus for printing continuous films bearing sound records thereon.

In order to distinctly describe the invention, it will be disclosed as it applies to the printing of continuous films bearing thereon a sound record composed of narrow light lines of varying density and in parallel relation. In describing the invention reference will be made to the appended drawings, in which:

Fig. 2 is a plan view, partly broken away, of the housing, printing aperture and stop controlling mechanism of the apparatus shown in Fig. 1.

Fig. 3 is a vertical section of the apparatus shown in Fig. 2, taken along line 3—3 thereof.

Figure 1:
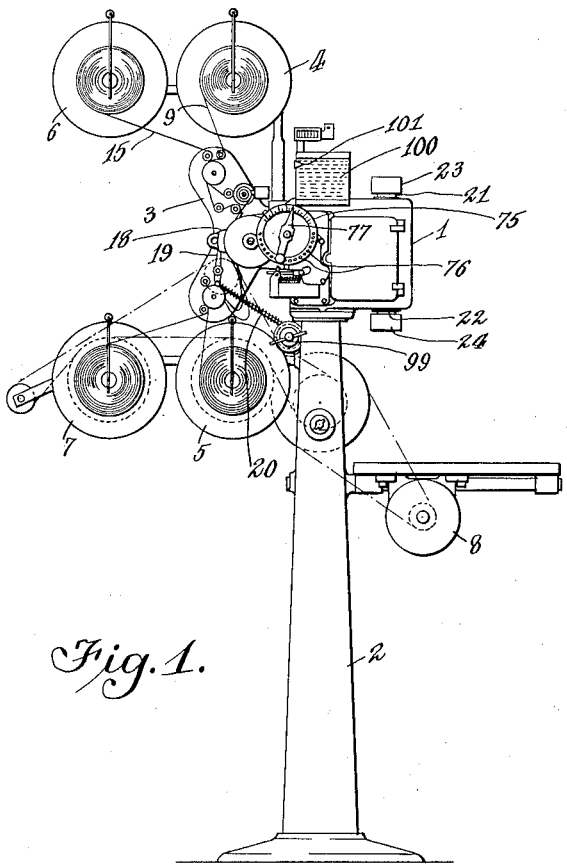
Fig. 1 is a side elevation of a continuous printing mechanism embodying the invention and adapted to carry out the method.

Referring generally to Fig. 1, the apparatus may include a suitable light housing 1 mounted upon a pedestal 2, provided with arms 3 carrying a plurality of rollers, sprockets and guides adapted to feed a continuous film transparency and a sensitive film by an aperture. The continuous film transparency may be supplied from a reel 4 to be wound upon a take-up reel 5. The sensitive film upon which it is desired to record the image carried by the transparency 4 may be supplied from a suitable reel 6 and taken up on a reel 7.

Motive power may be supplied by a suitable motor 8 carried upon an extension of the pedestal 2, the motor operating suitable driven sprockets for moving the film past the printing aperture and for driving the take-up reels 5 and 7.

The details of construction need not be given here as the invention does not pertain to this portion of the mechanism and the construction is well known in the art.

Referring to Figs. 2 and 3, it will be seen that the continuous film transparency 9 may pass over guide roller 10 and sprocket 11, and then be guided onto the printing head 12 by means of a plate 13, thereby passing over the printing aperture 14. The sensitive film 15 being supplied from the reel 6 may pass over guide roller 16 and sprocket 17 and also be directed over the printing head 12 so as to come in front of the printing aperture 14.

In operation, the films 9 and 15 are pressed together and against the printing face 12 by means of a presser block 18, shown in Fig. 1, but not shown in Figs. 2 and 3. The presser block 18 may be mounted upon a lever 19 and yieldably urged against the printing head 12 by suitable means such as for example the spring 20.

The housing 1 is preferably light-tight but may be provided with ventilators 21 and 22, provided with light trap covers 23 and 24, respectively. The light source within the housing 1, when the continuous film transparency 9 bears thereon a sound record consisting of parallel narrow light lines of varying density, preferably consists of a wide band or ribbon filament lamp 25 in a suitable socket 26.

In view of the fact that the narrow light lines of varying density carried by the continuous film transparency 9 extends transversely of the length of the film 9, I preferably employ a source of illumination or lamp 25 having a filament in the form of a ribbon or band, which when inserted in the socket 26 assumes a position roughly parallel to the narrow light bands carried upon the film 9. In other words, the filament 27 of the lamp 25 preferably assumes a substantially horizontal position. Lamps of the character indicated in the drawings are provided with U-shaped filaments 27 connected to the terminals 28 and exposing a substantially flat face 29.

It will be understood that an incandescent filament of such shape will present a face 29 of substantially uniform light intensity, but the light intensity at the corners 30 of said light filament will be lower. Means have been provided for correcting this unequal light intensity during the printing operation, as will be described hereinafter.

Means have also been provided for adjustably positioning the filament face 29 so as to cause said filament face to assume a position at the proper distance from the printing aperture 14, and in a suitable plane thereto and to the light lines carried by the film transparency 9. These means may comprise a holder 31 for the socket 26, the holder 31 being provided with a locking screw 32 whereby it may be rigidly connected to the socket 26.

The socket 26 may be adjustably positioned within the holder 31 by rotating the holder 26 within the holder 31 until the lamp 25 carried by the socket 26 presses its filament face 29 directly toward the printing aperture 14. In other words, by rotating the socket 26 the filament face 29 may be positioned in a plane parallel to the plane of the printing aperture and the plane of the continuous film transparency 9 as it passes said aperture.

The holder 31 may terminate in a circular boss 33 fitting within a holder 34 in which the boss 33 may be adjustably positioned by means of a lock screw 35. By these means the holder 31 may be adjustably positioned and moved upon a plane at right angles to the axis of the circular boss 33 which is a part of the holder 31, and the lamp 25 swung or positioned in a plane substantially parallel to the plane of the films 9 and 15 as they pass the printing aperture 14.

The holder 34 may be provided with yoke 36 rigidly connected thereto or an integral part thereof, said yoke being adapted to slidably move upon parallel guides 37. The guides 37 are preferably at right angles to the axis of the circular boss 33, adjustably positioned within the carrier 34. Means for locking the holder 34 and the yoke 36 in position along the guides 37 may be provided, as illustrated by the set screws 38. By these means the lamp 25 may be moved in a plane substantially parallel to the plane of the films 9 and 15 as they pass the aperture 14, but transversely of the film face pressed at the aperture 14.

The transverse guides 37 may be carried by a cross head 39 slidably mounted upon horizontal guides 40 in a plane substantially perpendicular to the plane in which the guides 37 lie. Means for adjustably positioning the cross head 39 along the guides 40 may be provided, as is illustrated by the set screws 41. In this manner the lamp 25 and filament face 29 carried thereby may be adjustably positioned in a plane substantially perpendicular to the plane of the films 9 and 10 at the point where they cross the printing aperture 14.

A suitable lens system, generally referred to as 42, may be positioned within the housing 1 and between the filament of the lamp 25 and the printing aperture 14. The lens system 42 may be carried by a sleeve 43 attached to a collar 44 mounted upon a slide 45 which is slidably received in a slotted base 46 rigidly connected to the housing 1. The lens system 42 may be moved to and from the printing aperture 14 by means of a knurled knob 47 carried by a threaded shaft 48 in operative engagement with a threaded aperture in the base 46.

The shaft 48 may carry a collar 49 attached to the slide 45 so that by manipulating the knurled knob 47 the slide 45, and therefore the lens system 42 carried thereby, may be caused to move to or from the printing aperture 14. By these means the image of the face 29 of the filament 27 of the lamp 25 may be focused in the printing plane uncovered by printing aperture 14, the printing plane lying substantially on the outer surface of the printing head 12.

The lens system may also carry an iris diaphragm 50 connected to a sleeve 51 rotatably positioned within the sleeve 43, the sleeve 51 being provided with a flange 52 to which a pin 53 may be attached.

Figures 4, 5:
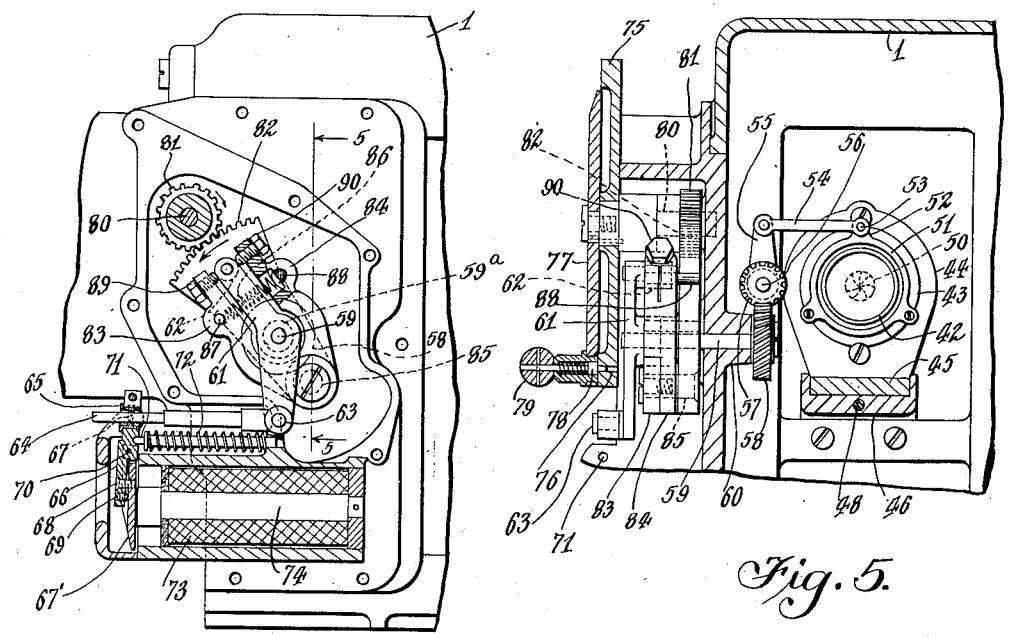
Fig. 4 is a side elevation, partly in section, of the stop control mechanism, the outer dial and pointer having been removed.
Fig. 5 is a transverse section taken through the apparatus shown in Fig. 4, along the plane indicated generally by line 5—5 of Fig. 4.

As has been mentioned hereinbefore, continuous films are composed of scenes, each scene being generally taken under particular conditions of lighting and exposure so that during printing adjustments have to be made in the exposure given the continuous film transparency. In the apparatus hereinabove described, the adjustment for different scenes is obtained by regulating the iris diaphragm 50, and automatic means may be provided for causing the diaphragm 50 to assume a predetermined and desired position. The automatic stop or diaphragm regulating means are illustrated in Figs. 1, 4 and 5 and comprise the following elements.

The pin 53 may be loosely connected to a link 54 which in turn is pivotally connected to a lever 55 which may be connected to a shaft 56 bearing a spiral or helical gear 57. The spiral gear 57 may mesh with a spiral gear 58 mounted upon a shaft 59 which is journaled in a boss 60 forming a part of the housing 1. A bell crank lever 61 may be rigidly connected to the shaft 59 exteriorly of the housing 1, carrying at one end a roller 62 and pivotally connected at the other end, as indicated at 63, to a rod 64. The rod 64 carries a pinch clutch bushing member 65 which is rigidly connected to a member 66 pivotally connected at 67 to a stationary portion of the mechanism.

The clutch member 65 may take the form of a bushing having a central portion of smaller internal diameter than the outer portion, as is well known in the art. The member 66 may be adjustably connected to an armature member 67', as by means of an adjusting screw 68 and a lock screw 69. The armature member 67' may be pivotally connected to the member 66 as indicated at 70.

The member 66 carrying the clutch 65 which is in operative contact with the rod 64, may be pressed outwardly by means of a rod 71 having a socket contact with the member 66 by means of a compression spring 72. The armature member 67' cooperates with an electro-magnet 73 provided with a core 74. Means for supplying electrical energy to the electro-magnet 73 are not shown in Fig. 4 but reference thereto is made in Fig. 9.

Exteriorly of the housing 1 an indicating dial 75 is positioned, said dial being provided with indices correlated with various positions or openings of the diaphragm 50. The dial 75 may also be provided with a plurality of apertures 76 with which a pointer or setting arm 77 is adapted to cooperate by means of an outwardly impelled plunger 78 attached to a knob 79 connected to one end of the member 77.

The indicating pointer 77 is rigidly connected to a shaft 80 bearing a spur gear 81. The spur 81 engages a sector or segmental gear 82 formed on one end of a member loosely journaled on the boss 59a forming part of housing 1, in which boss the shaft 59 is journaled.

The member 82 carries two arms 83 and 84 which are journaled on a pin 85 carried on that end of the member 82 opposed to the segmental gear. The two arms 83 and 84 are urged together by means of a tension spring 86 connected to pins 87 and 88, said pins 87 and 88 being rigidly connected to the members 83 and 84, respectively. The pins 87 and 88 extend inwardly on the members 83 and 84 so as to contact with the sides of the member 82. Semicircular grooves may be provided in the outer edges of the member 82 to cooperate with the pins 87 and 88, respectively.

The upper ends of members 83 and 84 may carry adjusting screws 89 and 90, respectively, the ends of said adjusting screws bearing against the roller 62 carried by the bell crank lever 61.

By moving the pointer or setting arm 77 to the next position at which printing is desired, say for example by moving it in a clockwise direction, the gear 81 will be caused to move in a clockwise direction, and the member 82 will be caused to move in the direction of the arrow. Such movement of the member 82 about the shaft 59 on which it is loosely journaled, carries with it member 83 by reason of contact between the pin 87 and the edge of the member 82, thereby separating the adjustment screw 89 from the roller 62 carried by the bell crank 61. The member 84, however, is maintained in the same position by reason of contact of the adjustment screw 90 with the roller 62 carried by the bell crank 61. The bell crank 61 is maintained in the same position by reason of the grip of the clutch 65 upon the rod 64 connected to the bell crank 61 at 63.

Figure 7:
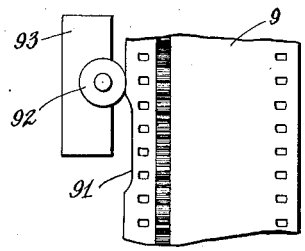
Fig. 7 is a front elevation of a transparency bearing a sound record thereon and a circuit interrupter cooperating therewith.
Figure 8:
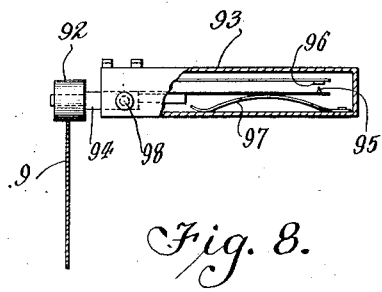
Fig. 8 is a plan view, partly in section, of the circuit interrupter and film shown in Fig. 7.

Spaces between different scenes on the continuous film transparency 9 may be indicated by means of a notch 91 cut in the edge of the film 9, as shown in Fig. 7. A contact mechanism or interrupter bearing a roller 92 which contacts with the edge of the film 9 causes a circuit to be closed when said roller 92 drops into the notch 91 cut in the edge of the film 9, which energizes the electromagnet 73 causing the armature member 67 to move towards the coil 73, thereby releasing the grip of the clutch member 65 upon the rod 64. The rod 64 thus released permits the bell crank lever 61 to be urged downwardly by the tension of spring 86 which has been extended by the downward movement of member 82 and member 83 hereinabove described.

The movement of the bell crank lever 61 is transmitted to shaft 59 which causes the spiral gear 58 to cause spiral gear 57 to partially rotate, thereby moving the lever 55 and link 54 so as to adjust the diaphragm 50 to the position indicated by the adjustment arm 77 upon the dial 75.

The circuit interrupter mentioned hereinabove may comprise a housing 93 in which may be pivoted an arm 94 carrying the roller 92 exteriorly of the housing 93. The arm 94 may carry a contact point 95 yieldably urged toward a stationary contact point 96 by a spring 97. The member 94 is preferably pivoted as indicated at 98 so means for making electrical connection with the contact points 96 and 97 may be provided.

The location of the circuit interrupter 93 with respect to other portions of the printing mechanism is indicated in Fig. 3.

Figure 9:
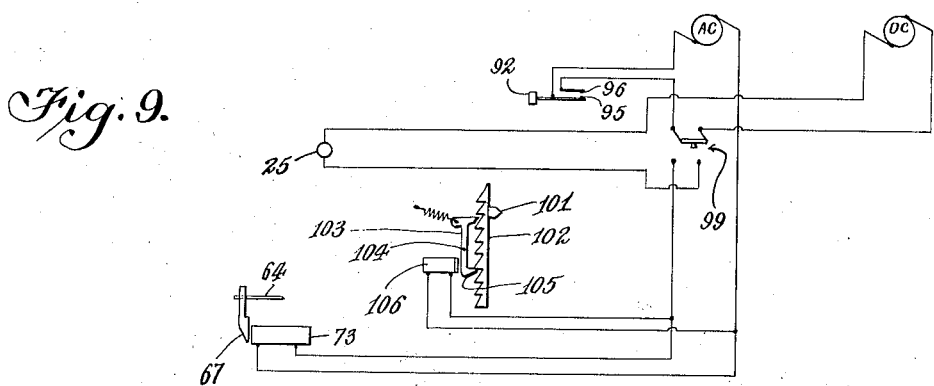
Fig. 9 is a diagrammatic representation of certain portions of the apparatus and a wiring diagram.

The correlation of the various elements hereinabove described is diagrammatically illustrated in Fig. 9. The apparatus is preferably supplied with alternating current for the operation of the solenoid or electromagnet 73, and with direct current for the operation of the lamp 25. The circuits for both the alternating current and the direct current may be closed by a double-pole switch 99 which immediately permits the current to flow into and light the lamp 25. The coil 73, however, is not energized until the roller 92 comes in contact with a notch 91 in the film 9, thereby closing the circuit by contact of the points 95 and 96.

In order to facilitate the operation, an indicating card 100 may be positioned in a suitable holder on the mechanism as shown in Fig. 1. An index member 101 may cooperate with the card 100. The card 100 bears thereupon the scenes which appear in the film 9 which it is desired to print, said scenes being located on the card 100 in the order in which they occur in the film 9. Furthermore, the card 100 may bear thereupon notations indicating what aperture opening should be employed in printing the various scenes in such film, together with the number of feet of film devoted to each scene.

The index member 101 may be attached to an escapement movement which is actuated co-jointly with the setting of the diaphragm 50 by the energization of the coil 73. The index 101 may be attached to a vertical rack arm 102 with which an anchor pallet 103 pivoted at 104 cooperates. The rack 102 may be supported by the lower tooth 105 of the pallet member 103 and when the circuit is closed by the movement of the roller 92 into a notch 91 in a film being printed, the coil 106 may be energized thus causing the tooth 105 to come out of contact with a tooth on the rack 102 and allowing said rack and index carried thereby to move downwardly a distance equivalent to the distance between teeth on said rack.

In this manner the index member 101 carried by said rack may move downwardly upon the card 100 every time the iris diaphragm is automatically reset by the action of the mechanism described hereinabove.

From the hereinabove description it will be obvious that an apparatus has been provided whereby continuous film transparencies bearing sound records thereon may be printed much more effectively than heretofore. By using a wide band incandescent filament as the source of light, and by introducing a lens system between the source of light and the printing aperture it is possible to form an intense narrow and substantially parallel beam of light at the printing aperture. Almost any lens system which gives sharp definition and is corrected for color aberration can be used satisfactorily, the principal change in the apparatus used in printing either sound track, action pictures or a combination of both being in the length of the filament.

As hereinabove stated the light intensity at the corners 30 of the filament 27 of the lamp 25 is lower than that at the face 29. Furthermore, it is impossible to produce a sharp distinct image of the corners 30 in the printing plane in the aperture 14.

Figure 6:
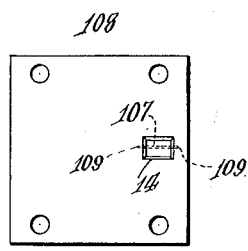
Fig. 6 is an enlarged view of the printing aperture.

For this reason it is preferred that the image of the filament formed at the printing plate be of greater area or of greater length than is required for printing. As shown in Fig. 6 the image 107 (particularly designed for use in the printing of sound records of the character shown in Fig. 7), is projected through the printing aperture 14 but is of greater length than the width of the printing aperture 14. In other words, the printing plate 108 provided with printing aperture 14 blocks out or limits the ends 109 of the projected image 107, said ends 109 being the images of the corners 30 of the filament 27 of lamp 25. That portion of the image 107 actually functioning for printing purposes therefore, is of intense and uniform light density.

It will be understood that when action or other scenes are to be printed from a continuous film transparency it is necessary to employ a wide band filament of the character shown in the drawings, and to increase the width of aperture 14 to the width of the image on film 9. The transparency 9 and the sensitive film 15 preferably move past the printing aperture 14 continuously and not intermittently.

The invention, therefore, generally described resides in projecting a printing light upon a printing aperture. One specific form of the invention lies in means for projecting an incandescent wide band or ribbon filament through a lens system upon a printing aperture, and limiting the image thus projected so as to produce a printing light of uniform light intensity.

The invention also relates to the provision of means for adjustably positioning the source of illumination in a printing mechanism and in the introduction of an adjustable lens system between the source of illumination and a printing aperture. Furthermore, the invention relates to a mechanism of improved character whereby the stop or diaphragm employed during the printing of various scenes of a continuous film transparency may be automatically changed, said stop changing mechanism being actuated by means cooperating with the film being printed. Furthermore, the stop changing mechanism permits the operator to set the mechanism for the succeeding stop change without stopping the printing operation.

Numerous changes and modifications may be made in the apparatus described in detail hereinabove, the invention including all such changes and modifications as come within the scope of the appended claims.

I claim:

1. In a printing apparatus for continuous films a substantially light-tight housing, a base for a light source within the housing, a printing aperture in said housing, a lens system positioned between the light source and said printing aperture, means for moving the lens system to and from the printing aperture, means for adjustably positioning said lens system, means for adjustably positioning the light source base with respect to said lens system, and means for partially rotating and adjustably and angularly positioning the light source base about an axis parallel to the axis of the lens system.

2. In a printing apparatus for continuous films a substantially light-tight housing, a printing aperture in said housing, a wide band filament lamp within said housing, a socket adapted to receive said lamp, means for focusing the filament of said lamp upon said printing aperture, said means including a lens system, an adjustable iris diaphragm in said lens system, means for adjustably positioning said lens system with respect to said printing apertures, means for adjustably positioning said socket and lamp with respect to the lens system, comprising means for adjustably positioning the socket in a plane parallel to the axis of the lens system, means for adjustably positioning the socket in a plane perpendicular to the axis of the lens system, pivotal means for angularly adjustably positioning the socket in a plane perpendicular to the axis of the lens system, means for passing a continuous film transparency past said printing aperture, means for adjustably positioning said iris diaphragm, and means actuated by said film transparency for energizing said last named means.

3. In a printing apparatus for continuous films a substantially light-tight housing, a printing aperture in said housing, a filament lamp within said housing, said lamp being adjustably pivoted on an axis parallel to the axis of the lens system, a lens system between said lamp and said printing aperture, means for adjustably positioning said lamp, means for adjustably positioning the lens system, an iris diaphragm in said lens system, means for adjusting the diaphragm, means for locking said adjusting means in position, means for pre-setting the diaphragm adjusting means, and means cooperating with the film to be printed adapted to release said locking means.

4. In a printing apparatus for continuous films, the combination of a housing, a wide band light filament support within said housing, a narrow printing aperture in said housing, a lens system between said light source and printing aperture, means for moving the lens system to and from the printing aperture, means for adjustably positioning said filament support, said filament support being adjustably pivoted on an axis parallel to the axis of the lens system, an iris diaphragm in the lens system, a shaft parallel to the lens axis, a bell crank carried by said shaft, a link connecting said bell crank and iris diaphragm, a shaft transverse to said lens axis extending out of said housing, a gear connection between said shafts, a bell crank lever mounted on said transverse shaft, a member substantially centrally journaled on said transverse shaft, said member being provided with a segmental gear at one end thereof, a pair of opposing arms pivotally connected to said member at the opposite end thereof, means for yeildably urging the free ends of said arms toward each other and into contact with opposite sides of one leg of said bell crank lever, means coacting with said member limiting said contracting movement of said pivoted arms, a locking means operably connected to the other leg of said bell crank lever to hold the same in position, means in operable engagement with the segmental gear carried by said member for pivoting the same on said transverse shaft to separate said arms carried thereby, and means cooperating with film being printed by said device for releasing said locking means and permitting said bell crank lever to be urged by one of said arms, and means for yieldably urging said arms together.

5. In a printing apparatus for continuous films, a substantially light-tight housing, a narrow printing aperture in said housing, a wide band filament lamp within said housing, a socket adapted to receive said lamp, means for focusing the filament of said lamp upon said printing aperture, said means including a lens system, and means for adjustably positioning said lens system with respect to said printing aperture, means for adjustably positioning said socket and wide band filament with respect to the printing aperture and the lens system, said socket being adjustably pivoted on an axis parallel to the axis of the lens system, an iris diaphragm in the lens system, a shaft parallel to the lens axis journaled within said housing, a bell crank carried by said shaft, a link connecting said bell crank and iris diaphragm, a shaft transverse to said lens axis journaled in and extending out of said housing, a gear connection between said shafts, a bell crank lever mounted on said transverse shaft externally of said housing, a member substantially centrally journaled on said transverse shaft, said member being provided with a segmental gear at one end thereof, a pair of opposing arms pivotally connected to said member at the opposite end thereof, means for yieldably urging the free ends of said arms toward each other and into contact with opposite sides of one leg of said bell crank lever, means carried by said arms and coacting with said member for limiting said contracting movement of said pivoted arms, a pinch clutch operably connected to the other leg of said bell crank lever to hold the same in position, means in operable engagement with the segmental gear carried by said member for pivoting the same on said transverse shaft to separate said arms carried thereby, and means cooperating with film being printed for releasing said pinch clutch and bell crank lever to rotate said transverse shaft and actuate said iris diaphragm.

6. In a printing apparatus for continuous films the combination of a housing, a light filament support within said housing, a printing aperture in said housing, a lens system between said light source and printing aperture, an iris diaphragm in the lens system, a shaft parallel to the lens axis, a bell crank carried by said shaft, a link connecting said bell crank and iris diaphragm, a shaft transverse to said lens axis extending out of said housing, a gear connection between said shafts, a bell crank lever mounted on said transverse shaft, a member substantially centrally journaled on said transverse shaft, said member being provided with a segmental gear at one end thereof, a pair of opposing arms pivotally connected to said member at the opposite end thereof, means for yieldably urging the free ends of said arms toward each other and into contact with opposite sides of one leg of said bell crank lever, means coacting with said member limiting said contracting movement of said pivoted arms, a locking means operably connected to the other leg of said bell crank lever to hold the same in position, means in operable engagement with the segmental gear carried by said member for pivoting the same on said transverse shaft to separate said arms carried thereby, means for releasing said locking means and permitting said bell crank lever to be urged by one of said arms, and means for yieldably urging said arms together.

7. In a printing apparatus for continuous films, the combination of a housing, a light filament support within said housing, a printing aperture in said housing, a lens system between said light source and printing aperture, an iris diaphragm in the lens system, a shaft transverse to said lens axis extending out of said housing, means operably connecting said transverse shaft and iris diaphragm whereby said iris is actuated by partial rotation of said shaft, a bell crank lever mounted on said transverse shaft, a member substantially centrally journaled on said transverse shaft, said member being provided with a segmental gear at one end thereof, a pair of opposing arms pivotally connected to said member at the opposite end thereof, means for yieldably urging the free ends of said arms toward each other and into contact with opposite sides of one leg of said bell crank lever, means coacting with said member limiting said contracting movement of said pivoted arms, a locking means operably connected to the other leg of said bell crank lever to hold the same in position, means in operable engagement with the segmental gear carried by said member for pivoting the same on said transverse shaft to separate said arms carried thereby, means for releasing said locking means and permitting said bell crank lever to be urged by one of said arms, and means for yieldably urging said arms together.

8. In a printing apparatus for continuous films, the combination of a substantially light-tight housing, a printing aperture in said housing, a wide band filament lamp within said housing, a socket adapted to receive said lamp, means for focusing the filament of said lamp upon said printing aperture, said means including a lens system and means for adjustably positioning said lens system with respect to said printing aperture; means for adjustably positioning said socket and wide band filament with respect to the printing aperture and the lens system, said means comprising means for adjustably positioning the socket in a plane parallel to the axis of the lens system, means for adjustably positioning the socket in a plane perpendicular to the axis of the lens system, and means for angularly positioning the socket in a plane perpendicular to the axis of the lens system and about an axis parallel to the axis of the lens system, whereby the band filament of said lamp may be adjusted into parallel relation with said printing aperture.

9. In a printing apparatus for continuous films the combination of a substantially light-tight housing, a printing aperture in said housing, a wide band filament lamp within said housing, a socket adapted to receive said lamp, means for focusing the filament of said lamp upon said printing aperture, said means including a lens system and means for adjustably positioning said lens system with respect to said printing aperture; means for adjustably positioning said socket and wide band filament with respect to the printing aperture and the lens system, said means including means for adjustably positioning the socket in a plane parallel to the axis of the lens system, and means for partially rotating and angularly positioning the socket about an axis parallel to the axis of the lens system, whereby the band filament of said lamp may be adjusted into parallel relation with said printing aperture, and means for passing a continuous film transparency and a sensitive film in printing relation to each other past said printing aperture.

Signed at Los Angeles, California, this 8th day of March, 1929.

ANTHONY G. WISE.